(12) United States Patent
Ralhan

(10) Patent No.: US 11,138,376 B2
(45) Date of Patent: Oct. 5, 2021

(54) TECHNIQUES FOR INFORMATION RANKING AND RETRIEVAL

(71) Applicant: State Street Corporation, Boston, MA (US)

(72) Inventor: Dushyant Ralhan, Boston, MA (US)

(73) Assignee: STATE STREET CORPORATION, Boston, MA (US)

(*) Notice: Subject to any disclaimer, the term of this patent is extended or adjusted under 35 U.S.C. 154(b) by 189 days.

(21) Appl. No.: 16/418,827

(22) Filed: May 21, 2019

(65) Prior Publication Data
US 2019/0354509 A1 Nov. 21, 2019

Related U.S. Application Data

(60) Provisional application No. 62/674,381, filed on May 21, 2018.

(51) Int. Cl.

| | |
|---|---|
| G06F 40/295 | (2020.01) |
| G06F 16/9032 | (2019.01) |
| G06F 16/906 | (2019.01) |
| G06F 16/93 | (2019.01) |
| G06N 20/00 | (2019.01) |
| G06F 16/11 | (2019.01) |
| G06F 16/13 | (2019.01) |
| G06K 9/62 | (2006.01) |
| G06N 3/04 | (2006.01) |
| G06F 40/30 | (2020.01) |

(52) U.S. Cl.
CPC .......... *G06F 40/295* (2020.01); *G06F 16/116* (2019.01); *G06F 16/13* (2019.01); *G06F 16/906* (2019.01); *G06F 16/90332* (2019.01); *G06F 16/93* (2019.01); *G06F 40/30* (2020.01); *G06K 9/623* (2013.01); *G06K 9/6218* (2013.01); *G06K 9/6257* (2013.01); *G06K 9/6264* (2013.01); *G06N 3/0454* (2013.01); *G06N 20/00* (2019.01)

(58) Field of Classification Search
CPC ...... G06F 40/295; G06F 16/906; G06F 16/93; G06F 16/90332; G06F 16/116; G06F 16/13; G06F 40/30; G06N 20/00; G06N 3/0454; G06K 9/6218; G06K 9/623; G06K 9/6257; G06K 9/6264
USPC ...................................................... 707/741
See application file for complete search history.

(56) References Cited

U.S. PATENT DOCUMENTS

| | | | |
|---|---|---|---|
| 2004/0181746 A1* | 9/2004 | McLure | G06F 40/154 715/233 |
| 2006/0083214 A1* | 4/2006 | Grim | H04L 63/0442 370/351 |
| 2018/0314705 A1* | 11/2018 | Griffith | G06F 16/116 |
| 2019/0114362 A1* | 4/2019 | Subbian | G06F 16/24578 |

* cited by examiner

*Primary Examiner* — Evan Aspinwall
(74) *Attorney, Agent, or Firm* — Kacvinsky Daisak Bluni PLLC

(57) ABSTRACT

Systems, methods, apparatuses, and computer-readable media for information ranking and retrieval are described. In one embodiment, an apparatus may include a processor and a memory storing instructions which when executed by the processor cause the processor to access an ingested document, generate a converted document from the ingested document based on a conversion configuration, the converted document comprising at least one paragraph, and generate an index based on the converted document and an index configuration. Other embodiments are described.

17 Claims, 18 Drawing Sheets

TECHNIQUES FOR INFORMATION RANKING AND RETRIEVAL

CROSS-REFERENCE TO RELATED APPLICATIONS

This application claims the benefit of U.S. Provisional Application No. 62/674,381 filed May 21, 2018. The aforementioned provisional application is incorporated by reference herein in its entirety.

TECHNICAL FIELD

Embodiments disclosed herein relate to the field of information ranking and retrieval.

BACKGROUND

Enterprises have access to large volumes of information to facilitate making operational decisions. Accordingly, methods for effectively retrieving information of interest from a large amount immaterial data have become crucial. A fully-functional enterprise-level information retrieval system requires a combination of various capabilities, including setting up consumers, ingesting documents, specifying an access control model, implementing an application interface, and deploying it to a server, and/or the like. Conventional systems are not capable of providing an efficient full end-to-end search experience, for example, from index setup to document ingestion, to end-user application. As a result, data consumers do not have access to a comprehensive system capable of providing robust and effective information retrieval at the enterprise level to facilitate managing the large volume of available information.

DETAILED DESCRIPTION

Embodiments disclosed herein provide techniques, processes, and/or apparatus for information ranking and retrieval. In some embodiments, an information rank and retrieval process may operate to provides a configuration-based approach to ingest documents, create search indices, upload ranking file, and create an out-of-the-box search user interfaces (UIs) that may be packaged in docker-containers and/or deployed to a runtime cloud more efficiently and effectively than conventional systems. In various embodiments, an information rank and retrieval process may operate to, among other things, ingest various document types and provide separation of data in a multi-tenancy model.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Figure 1:
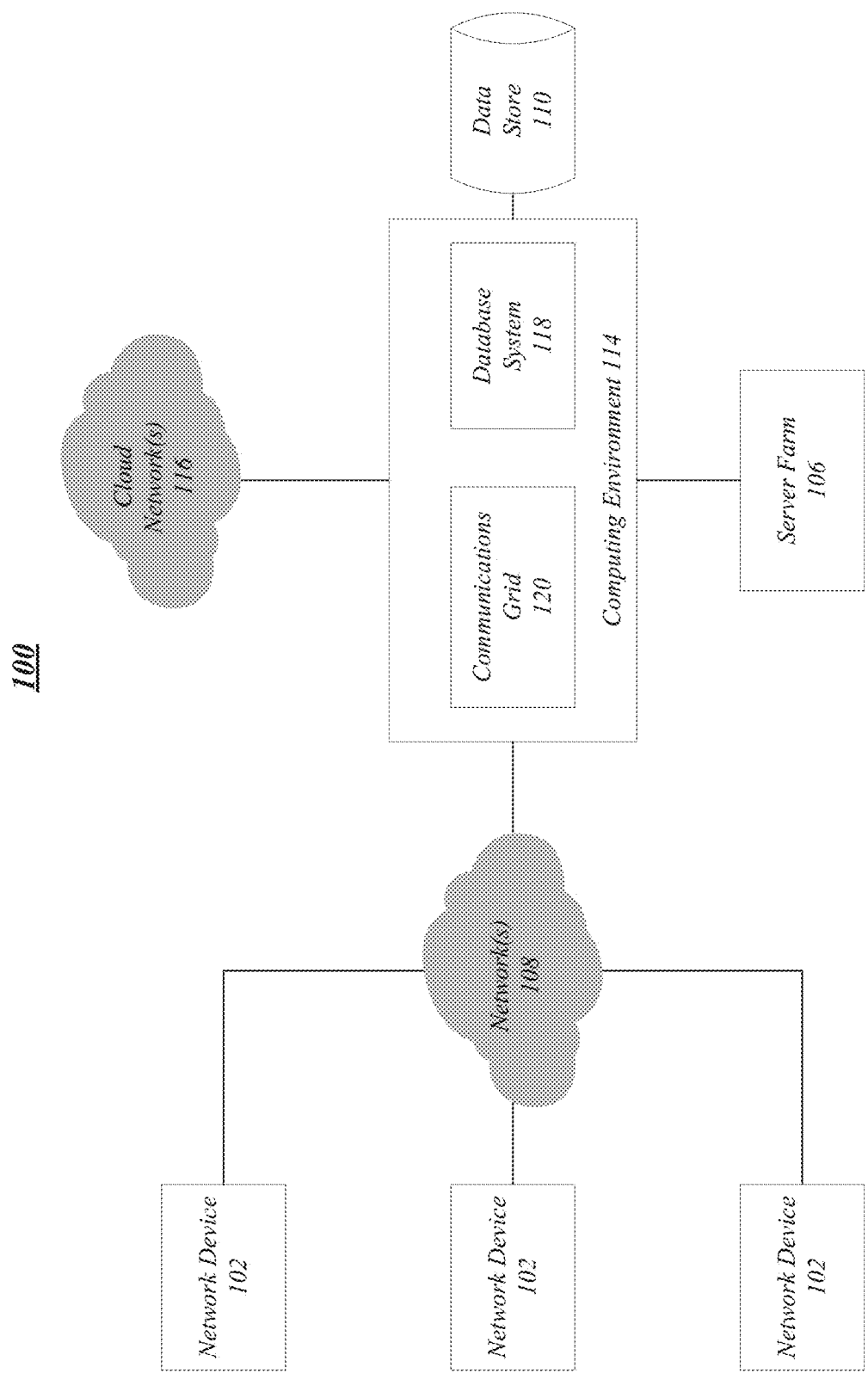
FIG. 1 depicts hardware components of a data transmission network.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that are capable of communicating with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

In other embodiments, network devices may provide a large amount of data, either all at once or streaming over a period of time to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things (IoT), such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
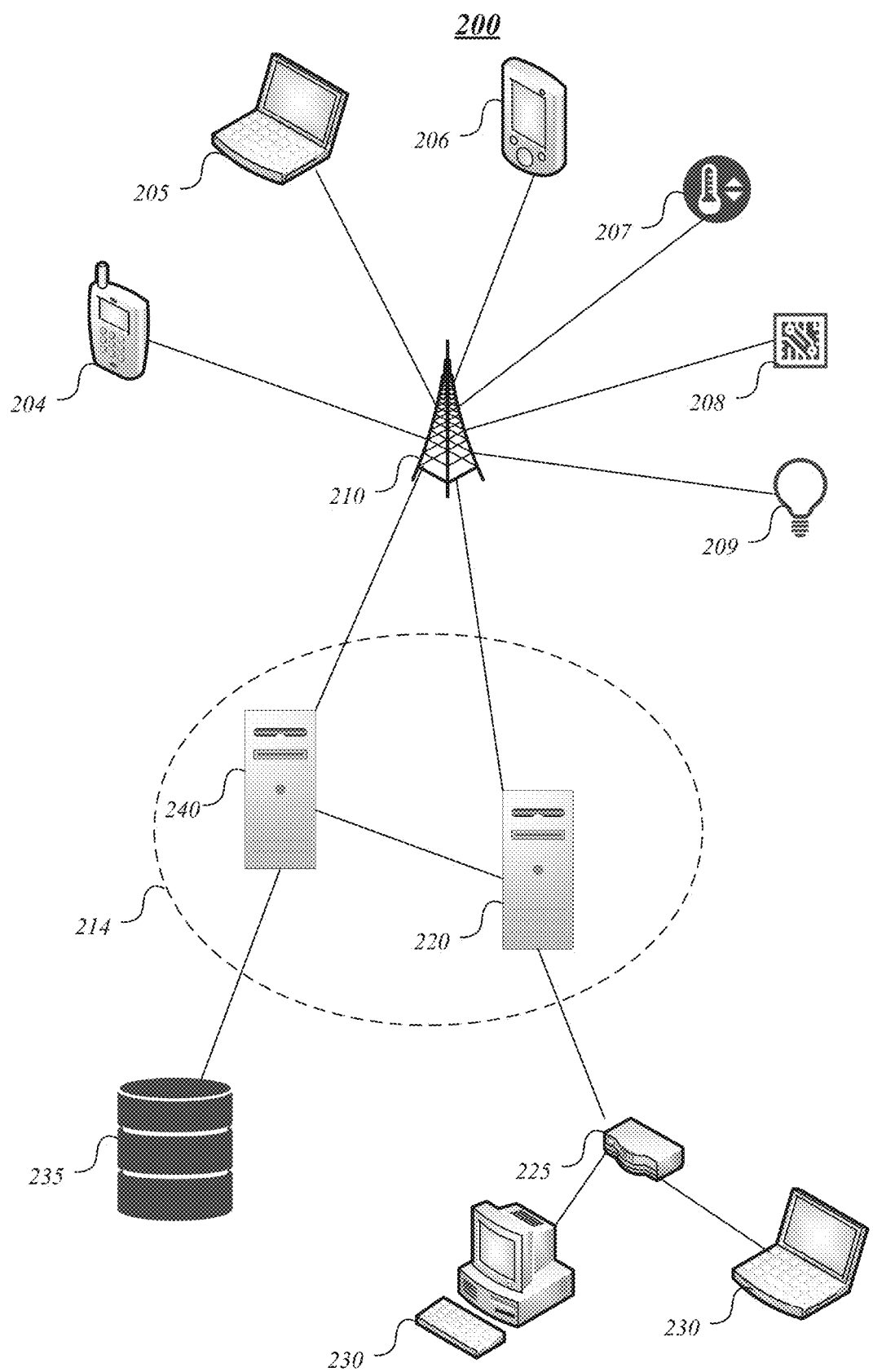
FIG. 2 depicts an example network including an example set of devices communicating with each other over an exchange system.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., a financial operation). The network devices may detect and record data related to the environment that it monitors and transmit that data to computing environment 214.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 202 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 214, or before deciding whether to transmit data to the computing environment 214. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240, such as a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
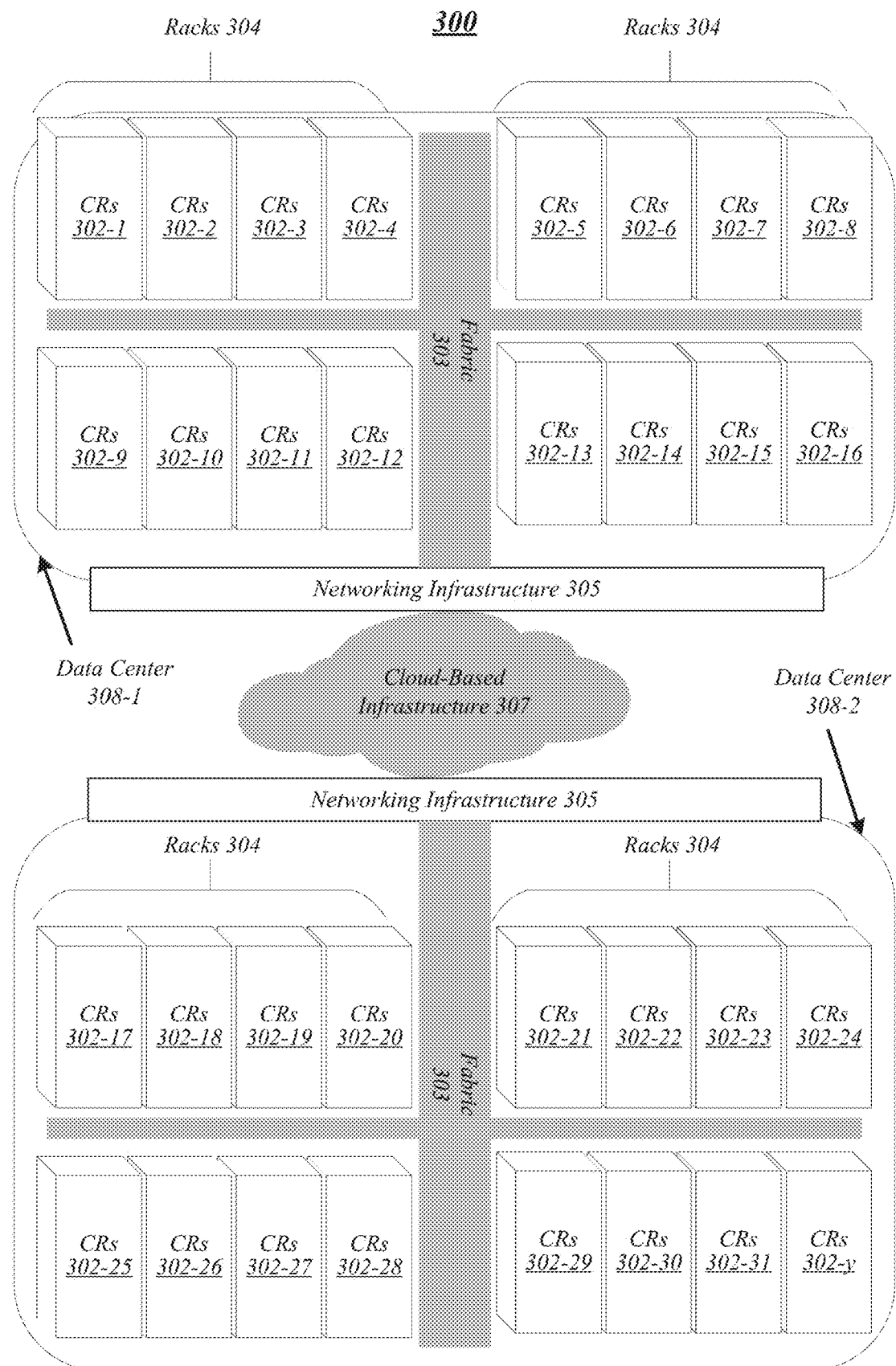
FIG. 3 illustrates an embodiment of an example system.

FIG. 3 illustrates a conceptual overview of a system 300 that may generally be representative of a distributed cloud-based computing system or another type of computing network in that one or more techniques described herein may be implemented according to various embodiments. As shown in FIG. 3, system 300 may generally include computing resources (CRs) 302-$y$, where y may be any positive integer, to compute information and data. The computing resources 302 may include resources of multiple types, such as—for example—processors, co-processors, fully-programmable gate arrays (FPGAs), memory, networking equipment, circuit boards, storage, and other computing equipment. The embodiments are not limited to these examples.

The computing resources 302 may be included as part of a computer, such as a server, server farm, blade server, a server sled, or any other type of server or computing device, and may be within one or more racks 304. In embodiments, the racks 304 may be part of one or more data centers 308 and may be coupled with each other via various networking equipment. For example, the racks 304 within a data center 308 may be coupled with each via a fabric 303. The fabric 303 may include a combination of electrical and/or optical signaling media, and high bandwidth interconnects, such as Gigabit Ethernet, 10 Gigabit Ethernet, 100 Gigabit Ethernet, InfiniBand, Peripheral Component Interconnect (PCI) Express (PCIe), and so forth. Further, the fabric 303 may include switching infrastructure, such as switches, routers, gateways, and so forth. The fabric 303 is configured such that any rack 304 may send signals to (and receive signals from) each other racks 304 within a data center 308 to communicate data and information. In embodiments, the fabric 303 may be coupled with networking infrastructure 305 such that it enables communication of signals between racks of one data center 308 with racks 304 of another data center 308 to communicate data and information. For example, FIG. 3 illustrates racks 304 of data center 308-1 coupled with racks 304 of data center 308-2 via fabrics 303, networking infrastructure 305, and the cloud-based infrastructure 307.

In embodiments, the networking infrastructure 305 includes networking equipment, such as routers, firewalls, switches, gateways, cabling, and so forth to communicate data and information between a data center 308 and with the cloud-based infrastructure 307 and another data center 308. For example, the networking infrastructure 305 may include edge access routers, edge access switches, and edge firewalls capable of communicating with core routers, core switches, and core firewalls of the cloud-based infrastructure 307. The core networking equipment of the cloud-based infrastructure 307 may couple with edge networking equipment of another data center 308 to enable communication between data centers 308. Note that embodiments are not limited in this manner, and the networking infrastructure 305 and/or cloud-based infrastructure 307 may include other networking equipment, servers, relays, interconnects, and so forth to enable communication between a data center 308 and other data centers 308.

In one example, the system 300 may be a distributed cloud-based computing system to provide a financial service platform. The system 300 may process data and information, such as financial data and financial information, to provide financial services, for example. The financial services include, but are not limited to, investment and asset management services, active equity management services, active quantitative equity services, cash fund services, alternatives services, currency management services, index investing services, electronic trading services, multi-asset services, investment research services, investment trading services, accounting services, custody services, fund administration services, outsourcing services, performance measurement services, portfolio analysis services, data analytics services, investment analytics services, benchmark/indices/indicator services, D-as-a-Service (DaaS) services, and so forth. Embodiments are not limited to these examples. To provide these financial services, the system 300 may dynamically pool or compose a plurality of the computing resources 302 together within a data center 308 and/or among data centers 308 in the cloud via the cloud-based infrastructure 307. In one example, computing resources 302 of data center 308-1 may be composed with computing resources 302 of data center 308-2 to process data and information, e.g., a job, to provide a financial service. Once the job complete, the system 300 may decompose the composed computing resources 302 and make the computing resources 302 available to process another job. Note that in embodiments, the system 300 may enable multiple instances of pooled or composed computing resources 302 to provide data and information processing in parallel and embodiments are not limited in this manner.

In embodiments, system 300 may be coupled with one or more other systems, such as investment trading systems, banking systems, regulatory systems, risk management systems, performance systems, accounting system, data warehouse systems, financial institution system, and so forth. These other systems may be coupled with system 300 via networking, such as the networking infrastructure 305 and the cloud-based infrastructure. Embodiments are not limited in this manner.

Figure 4:
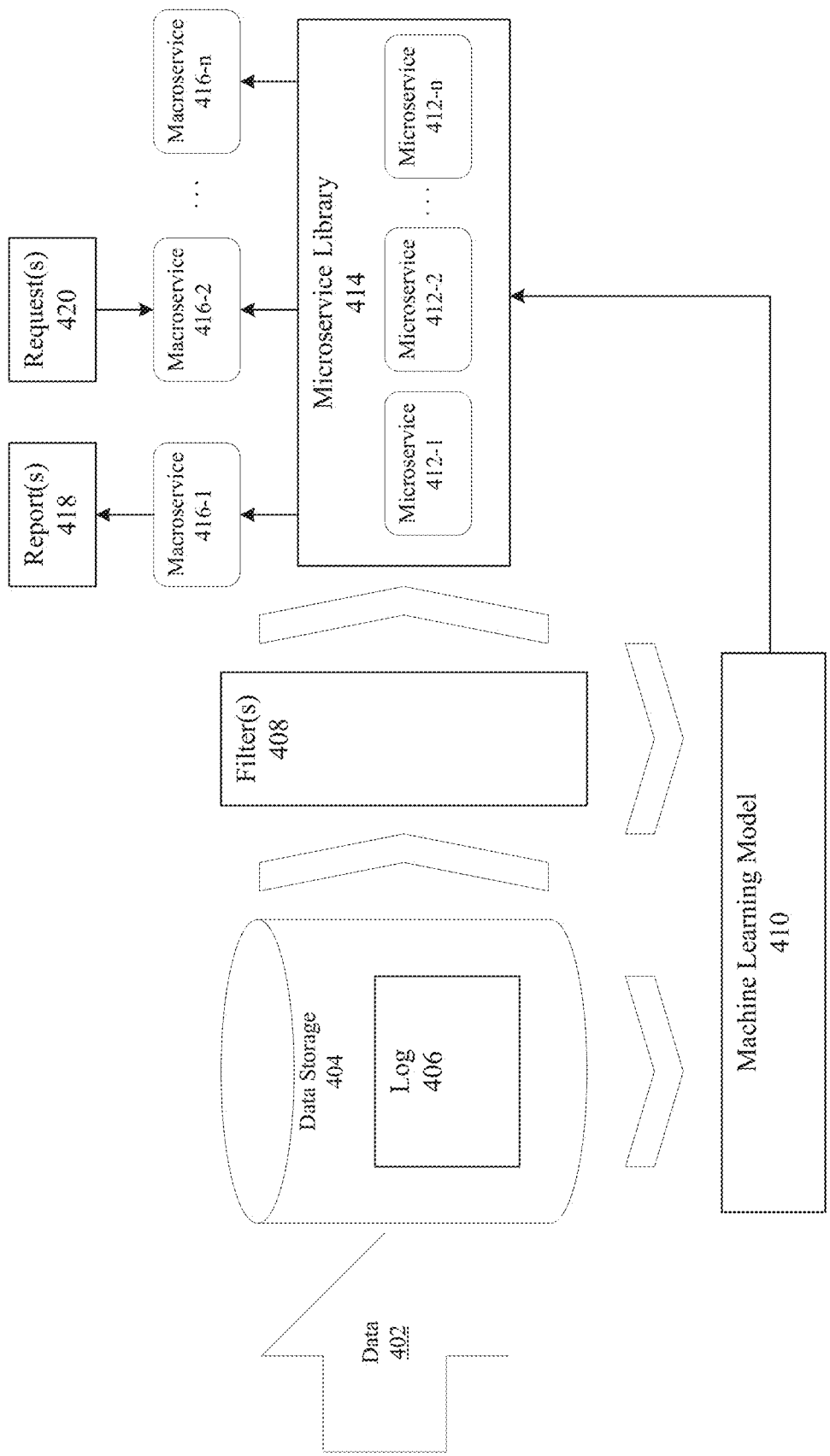
FIG. 4 illustrates an embodiment of exemplary logic and data flows through a computing architecture.

FIG. 4 depicts a block diagram 400 describing exemplary logic and data flows through a computing architecture. Data 402 may be received in a data storage 404. The data 402 may include discrete units of data and/or one or more data streams (e.g., communication channels that repeatedly provide one or more data units at a given rate). The data 402 may include, for example, data relating to an individual user (e.g., a financial client), aggregate data (e.g., reflecting conditions in a market, such as a financial market), cancelations of previously-received data, corrections of previously-received data, etc. In some cases, cancelations and/or corrections may be received that cancels or corrects other data items that have not yet been received (e.g., due to the order in which the data was transmitted or batched, network conditions, data losses, etc.).

The data storage 404 may include hardware, software, or a combination of hardware and software suitable for storing data. The data storage 404 may include one or more data structures, such as a log 406 or a database. The data structures may be configured to store and organize the data, and/or to facilitate retrieval of the data. In some embodiments, the log 406 may be organized chronologically (e.g., in the order in which the data 402 was received by the data storage 404, in a time-stamp order of the data 402, etc.). In some embodiments, the log 406 is a persistent and/or immutable log which allows individual data records to be written, but not to be directly deleted or changed.

In some embodiments, the data 402 stored in the data storage 404 may be subjected to one or more filters 408. The filters 408 may include data governance filters which, for example, match one or more rules against the data 402 and selectively pass the data 402 to other components in the architecture.

The data storage 404 and/or the filter(s) 408 may provide information to a machine learning model 410, such as an artificial neural network (ANN). The underlying model 410 may be configured to learn associations from patterns in the data 402, to predict future trends based on historical data observations, and to provide insights into why the data 402 appears the way that it does.

A library 414 of microservices **412-*i* may make use the data (e.g., the raw data stored in the data storage 404, the filtered data as presented by the filters 408, information output from the machine learning model 410, or various combinations of these types of data). Each microservice 412-*i* may represent an atomic computing unit configured to perform a defined task (e.g., computing a value for a financial variable for certain subsets of the data 402). The microservices 412-*i* may be used individually, or variously combined into macroservices 416-*i*. The macroservices 416-*i* may represent more complex operations in which the outputs of various microservices 412-*i*** are combined or otherwise used to perform a specified task.

For instance, one macroservice 416-1 may use the outputs of various microservices **412-*i* to generate a report 418 (such as a financial report, disclosure form, etc.). In another example, an entity (such as a financial regulator) may issue a request 420 via a macroservice 416-2, and the microservice 416-2 may perform various operations to comply with the request (e.g., calling on another macroservice 416-1 to generate a report responsive to the request 420, correcting data 402 in the data storage 404, etc.). In some embodiments, macroservices 416-*i* may themselves be combined together to form other macroservices 416-*i***.

The microservices **412-*i* and/or the macroservices 416-*i* may be exposed to a third party (e.g., by use of an application programming interface, or "API"). In some cases, a single entity may provide the microservices 412-*i* and the macroservices 416-*i*. In other cases, one entity may provide the library 414 of microservices 412-*i*, and another entity may use the microservices 414 to generate their own customized macroservices 416-*i***.

The machine learning model 410 may be generated and/or refined via a machine learning process, such as the one depicted in the flow chart of FIG. 4. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Figure 5:
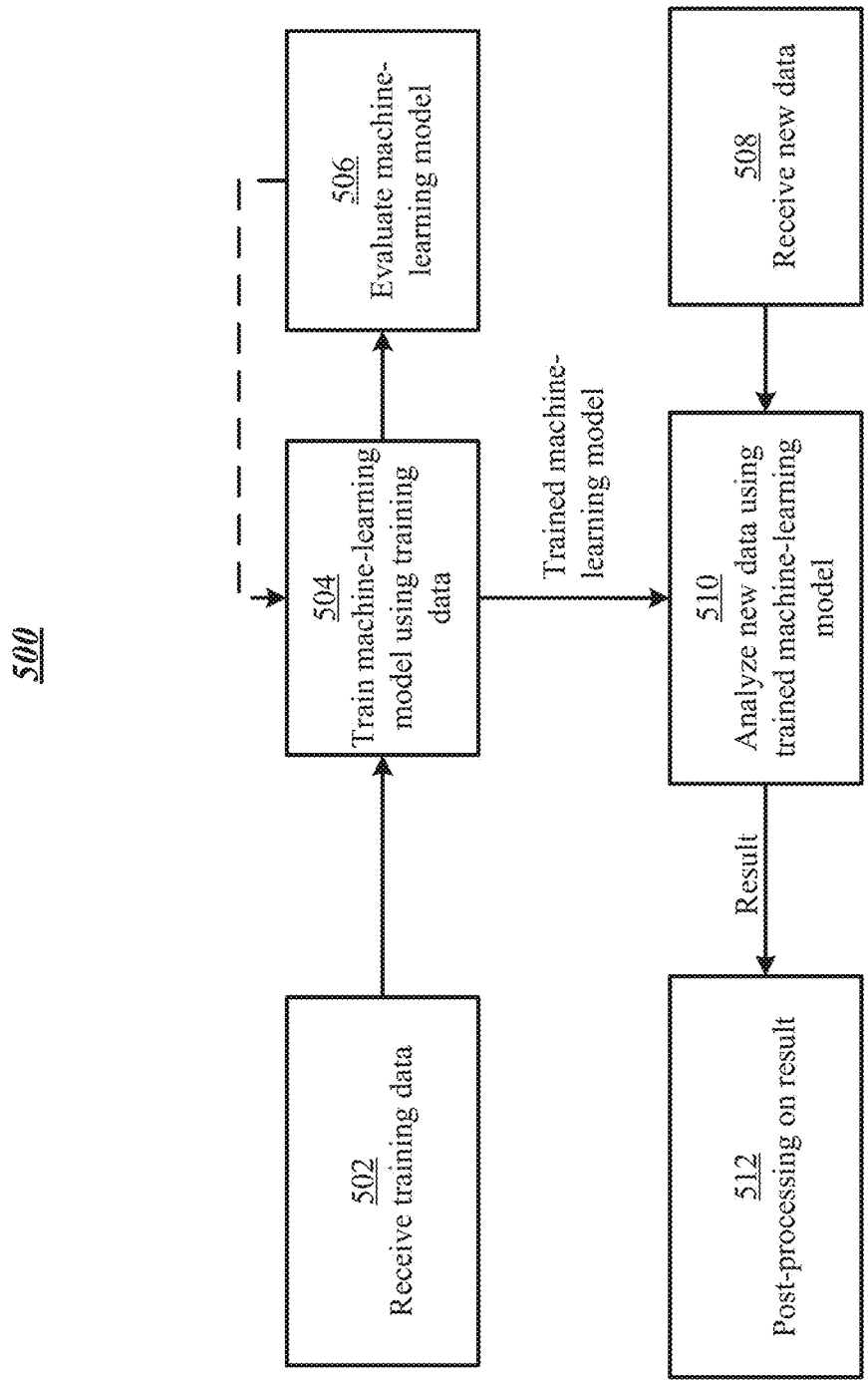
FIG. 5 illustrates an embodiment of a first logic flow.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart 500 of FIG. 5.

In block 502, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 504, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 506, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% value is an example only. A realistic and desirable accuracy percentage is dependent on the problem and the data.

In some examples, if the machine-learning model has an inadequate degree of accuracy for a particular task, the process can return to block 504, where the machine-learning model can be further trained using additional training data or otherwise modified to improve accuracy. If the machine-learning model has an adequate degree of accuracy for the particular task, the process can continue to block 508.

In block 508, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 510, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 512, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 6:
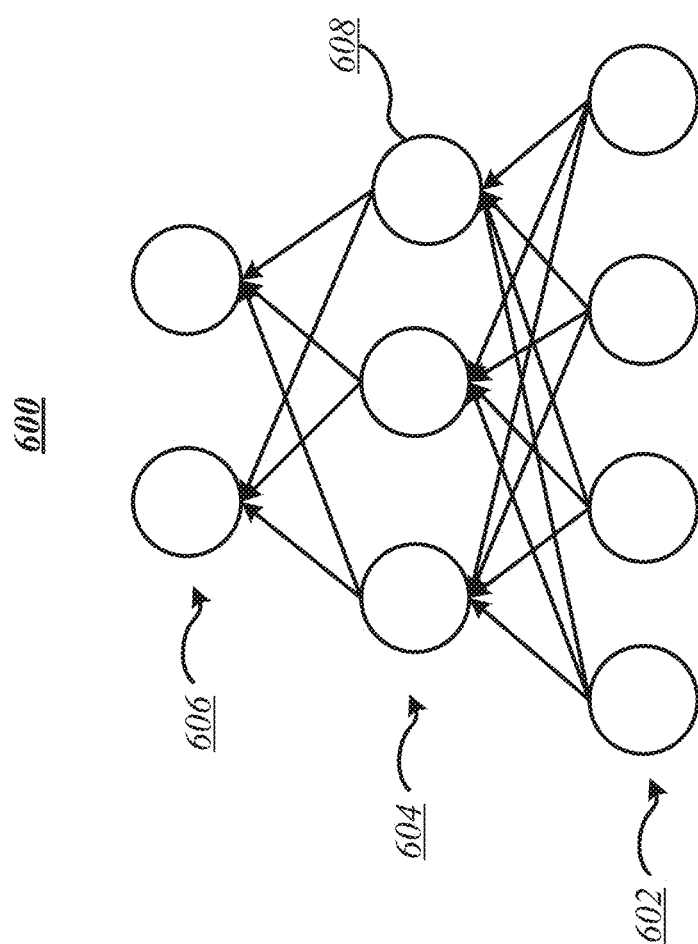
FIG. 6 illustrates an embodiment of a neural network.

A more specific example of a machine-learning model is the neural network 600 shown in FIG. 6. The neural network 600 is represented as multiple layers of interconnected neurons, such as neuron 608, that can exchange data between one another. The layers include an input layer 602 for receiving input data, a hidden layer 604, and an output layer 606 for providing a result. The hidden layer 604 is referred to as hidden because it may not be directly observable or have its input directly accessible during the normal functioning of the neural network 600. Although the neural network 600 is shown as having a specific number of layers and neurons for exemplary purposes, the neural network 600 can have any number and combination of layers, and each layer can have any number and combination of neurons.

The neurons and connections between the neurons can have numeric weights, which can be tuned during training. For example, training data can be provided to the input layer 602 of the neural network 600, and the neural network 600 can use the training data to tune one or more numeric weights of the neural network 600.

In some examples, the neural network 600 can be trained using backpropagation. Backpropagation can include determining a gradient of a particular numeric weight based on a difference between an actual output of the neural network 600 and a desired output of the neural network 600. Based on the gradient, one or more numeric weights of the neural network 600 can be updated to reduce the difference, thereby increasing the accuracy of the neural network 600. This process can be repeated multiple times to train the neural network 600. For example, this process can be repeated hundreds or thousands of times to train the neural network 600.

In some examples, the neural network 600 is a feed-forward neural network. In a feed-forward neural network, every neuron only propagates an output value to a subsequent layer of the neural network 600. For example, data may only move one direction (forward) from one neuron to the next neuron in a feed-forward neural network.

In other examples, the neural network 600 is a recurrent neural network. A recurrent neural network can include one or more feedback loops, allowing data to propagate in both forward and backward through the neural network 600. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 600 operates by receiving a vector of numbers from one layer; transforming the vector of numbers into a new vector of numbers using a matrix of numeric weights, a nonlinearity, or both; and providing the new vector of numbers to a subsequent layer of the neural network 600. Each subsequent layer of the neural network 600 can repeat this process until the neural network 600 outputs a final result at the output layer 606. For example, the neural network 600 can receive a vector of numbers as an input at the input layer 602. The neural network 600 can multiply the vector of numbers by a matrix of numeric weights to determine a weighted vector. The matrix of numeric weights can be tuned during the training of the neural network 600. The neural network 600 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 604, of the neural network 600. The subsequent layer of the neural network 600 can receive the transformed output, multiply the transformed output by a matrix of numeric weights and a nonlinearity, and provide the result to yet another layer of the neural network 600. This process continues until the neural network 600 outputs a final result at the output layer 606.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications system discussed herein.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 7:
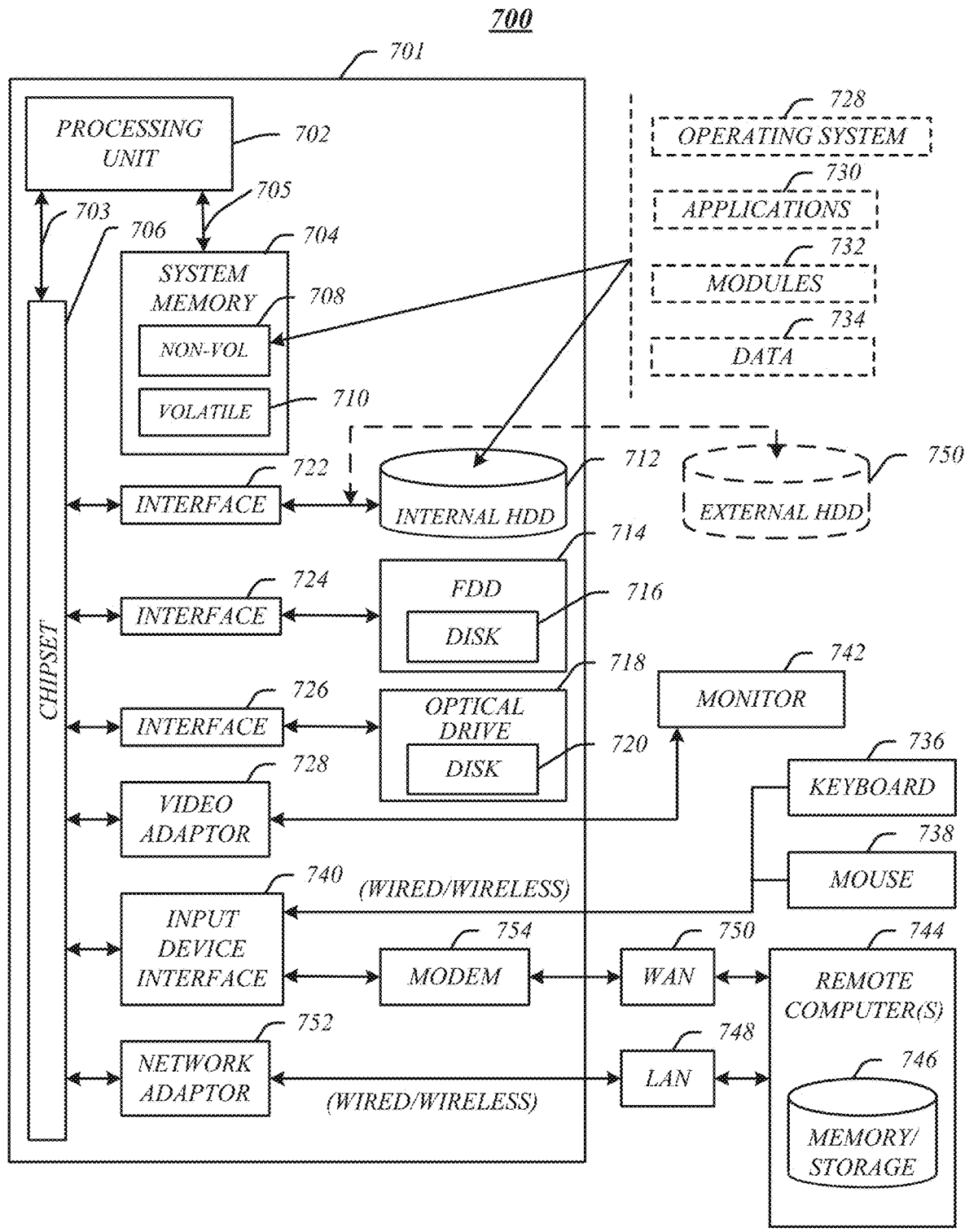
FIG. 7 illustrates an embodiment of an exemplary computing architecture.

The methods, systems, and functionality described herein may be embodied as instructions on a computer readable medium or as part of a computing architecture. FIG. 7 illustrates an embodiment of an exemplary computing architecture 700 suitable for implementing various embodiments described herein. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process executing on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a chipset 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i9™, Core m3™, vPro™, Itanium®, Pentium®, Xeon®, and XScale® processors; and similar processors. Dual microprocessors, multi-core processors, and other multi-processor architectures may also be employed as the processing unit 702.

In some embodiments, the processing unit 702 couples with the chipset 706 via a highspeed serial link 703 and couples with the system memory 704 via a highspeed serial link 705. In other embodiments, the processing unit 702 may couple with the chipset 706 and possibly other processor units via a system bus and may couple with the system memory 704 via the chipset 706. In further embodiments, the processing unit 702 and the chipset may reside in a System-On-Chip (SoC) package.

The chipset 706 provides an interface for system components including, but not limited to, the system memory 704 to the processing unit 702. The chipset 706 may couple with any of several types of bus structure that may further interconnect to a memory bus (with or without a memory controller), a peripheral bus, and a local bus using any of a variety of commercially available bus architectures. Interface adapters 722, 724, 726, 728, 740, 752, etc., may connect to the chipset 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components described herein.

A user may enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the chipset 706, but can be connected by other interfaces such as a parallel port, IEEE 694 serial port, a game port, a USB port, an IR interface, and so forth.

A monitor 742 or other type of display device is also connected to the chip set 706 via an interface, such as a video adaptor 728. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many of or all the elements described relative to the computer 701, although, for purposes of brevity, only a memory/storage device 746 is illustrated. The logical connections depicted include wire/ wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the chipset 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Some aspects may utilize the Internet of Things (IoT), where things (e.g., machines, devices, phones, sensors) can be connected to networks and the data from these things can be collected and processed within the things and/or external to the things. For example, with the IoT, sensors may be deployed in many different devices, and high-value analytics can be applied to identify hidden relationships and drive increased efficiencies. This can apply to both Big Data analytics and real-time (streaming) analytics.

Some systems may use Hadoop®, an open-source framework for storing and analyzing big data in a distributed computing environment. Apache™ Hadoop® is an open-source software framework for distributed computing. For example, some grid systems may be implemented as a multi-node Hadoop® cluster, as understood by a person of skill in the art. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction.

Figure 8:
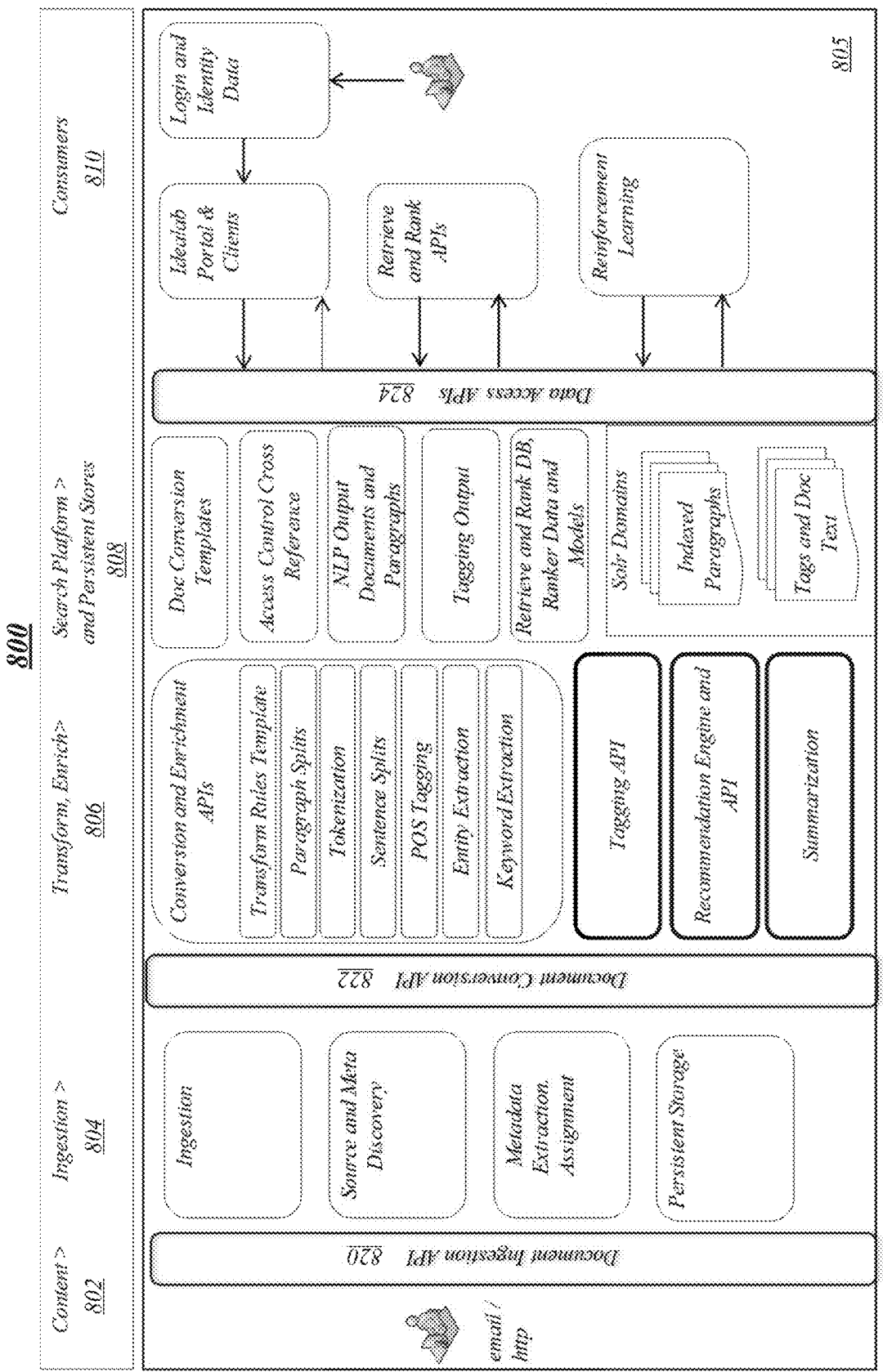
FIG. 8 illustrates a first operating environment according to some embodiments.

FIG. 8 illustrates an example of an operating environment 800 that may be representative of various embodiments. The operating environment 800 depicted in FIG. 8 may implement information rank and retrieval processes according to various embodiments. As shown in FIG. 8, operating environment 800 may include an architecture 805 operative to facilitate various functions of an information rank and retrieval process. Non-limiting examples of functions may include accessing content 802, ingestion 804, transformation/enrichment 808, and providing information to consumers 810. Various segments of architecture 805 may communicate via application programming interfaces (APIs), including, without limitation, a document ingestion API 820, a document conversion API 822, and/or a data access API.

Architecture 805 is capable of providing a plurality of functions according to some embodiments. Non-limiting examples of functions may include integrated information retrieval, for example, operative to work across document ingestion, summarization, tagging, intelligent search, recommendation, supervised learning, retrieve and rank, and facilitate Quantextual™ Idea Lab Portal (by State Street Corporation) functions; implement an extensible search architecture for potentially unlimited use cases; and implement separation of ingested and stored data and/or derived content across search, training, and/or other functions, and/or support multiple roles for data access.

Figure 9:
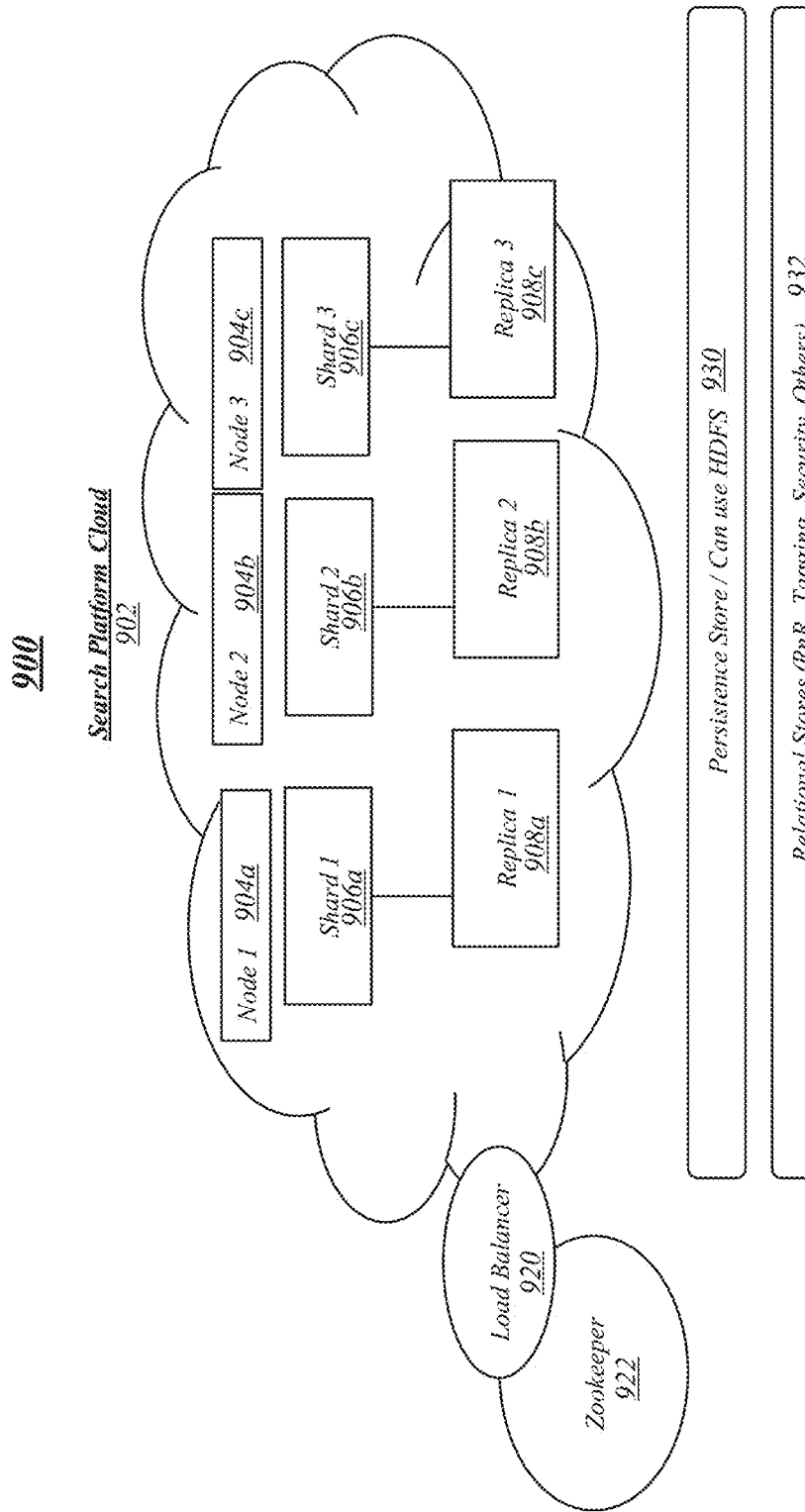
FIG. 9 illustrates a second operating environment according to some embodiments.

FIG. 9 illustrates an example of an operating environment 900 that may be representative of various embodiments. The operating environment 900 depicted in FIG. 9 may implement information rank and retrieval processes according to various embodiments. As shown in FIG. 9, operating environment 900 may include a search platform cloud 902. A non-limiting example of a search platform may include a platform implemented via Apache Solr™ enterprise search platform. Although Solr is used as an example search platform in some examples, embodiments are not so limited, as any search platform implementation capable of operating according to some embodiments is contemplated herein. In various embodiments, search platform cloud 902 may include a Solr™ cloud running operationally in a high availability (HA) mode.

Search platform cloud 902 may include a plurality of nodes 904a-c associated with shards 906a-c and/or replicas 908a-c. In exemplary embodiments, shards 906a-c may include n partitions of an index. In various embodiments, documents may be assigned to a specific shard 906a-c leader, for example, operative to persist the documents then replicates. In some embodiments, search platform cloud 902 may be associated with a load balancer 920 and/or a zookeeper 922. In various embodiments, zookeeper 922 may operate to provide centralized configuration information and/or distributed synchronization for operations of search platform cloud 902. In some embodiments, zookeeper 922 may operate to provide cluster state management, fault tolerance, and/or committed writes across nodes. Search platform cloud 902 may operate to provide HA operation, fail over management, cluster management, configuration management, node registry, query distribution, and/or the like.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium. Embodiments are not limited in this context.

Figure 10:
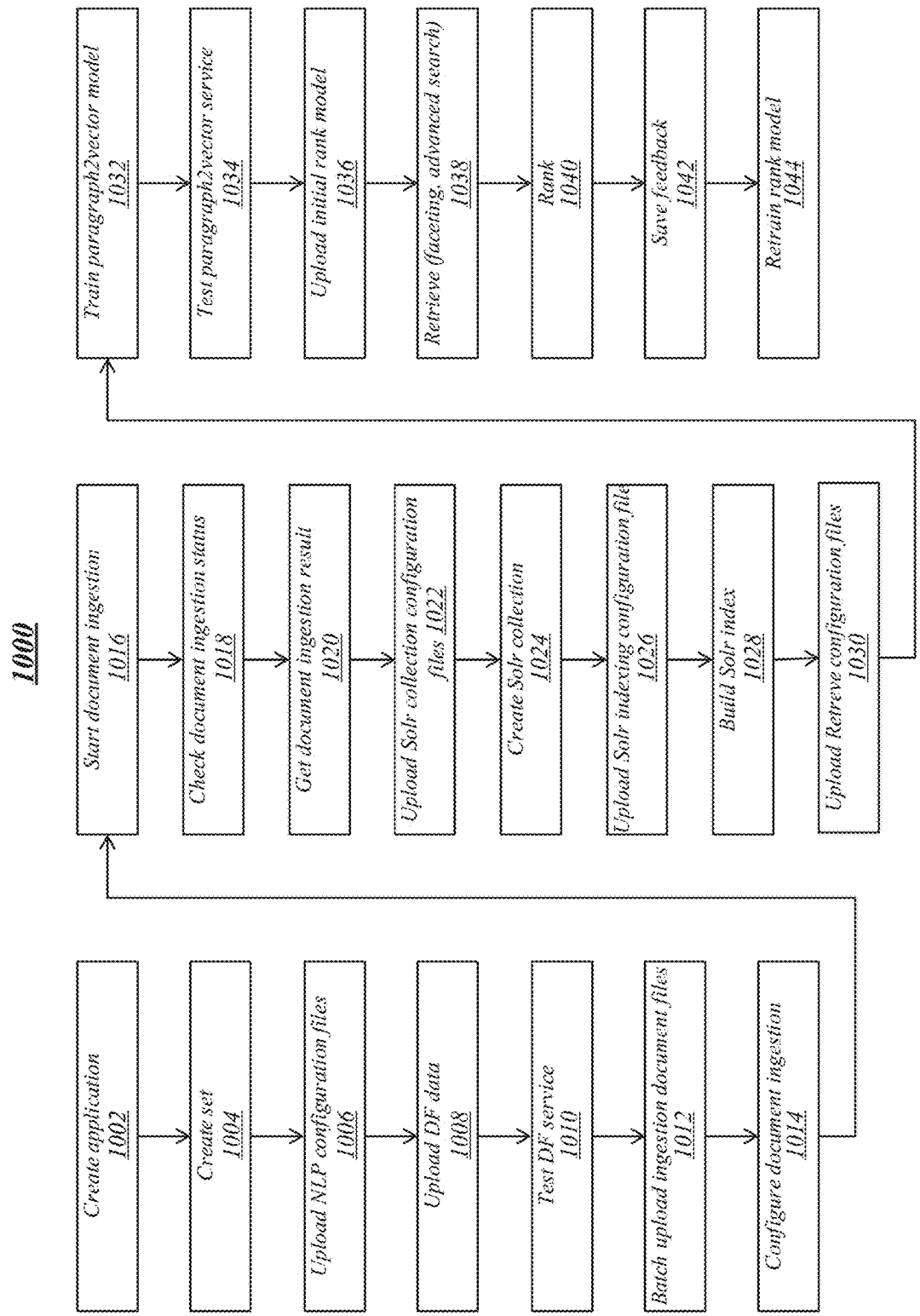
FIG. 10 illustrates an embodiment of a second logic flow.

FIG. 10 illustrates an embodiment of a logic flow 1000. Logic flow 1000 may be representative of some or all of the operations executed by one or more embodiments described herein, such as computing device 701. In some embodiments, logic flow 1000 may be representative of some or all of the operations of an information rank and retrieval process.

In various embodiments, logic flow 1000 may create an application 1002, create a set 1004, upload natural language processing (NLP) configuration files 1006, upload document frequency (DF) data 1008, test DF service 1010, (batch) upload ingestion document files 1012, and configure document ingestion 1014.

In some embodiments, logic flow 1000 may start document ingestion 1016, check document ingestion status 1018, get document ingestion results 1020, upload search platform (Solr™) collection configuration files 1022, create search platform collection 1024, upload search platform indexing configuration file 1026, build search platform index 1028, and/or upload retrieve configuration files 1030.

In exemplary embodiments, logic flow may train a paragraph2vector (P2V) model 1032, test P2V service 1034, upload initial rank model 1036, retrieve 1038, rank 1040, save feedback 1042 (for instance, user feedback), and/or retrain rank model 1044 (for instance, based on feedback or other subsequent information).

Figure 11:
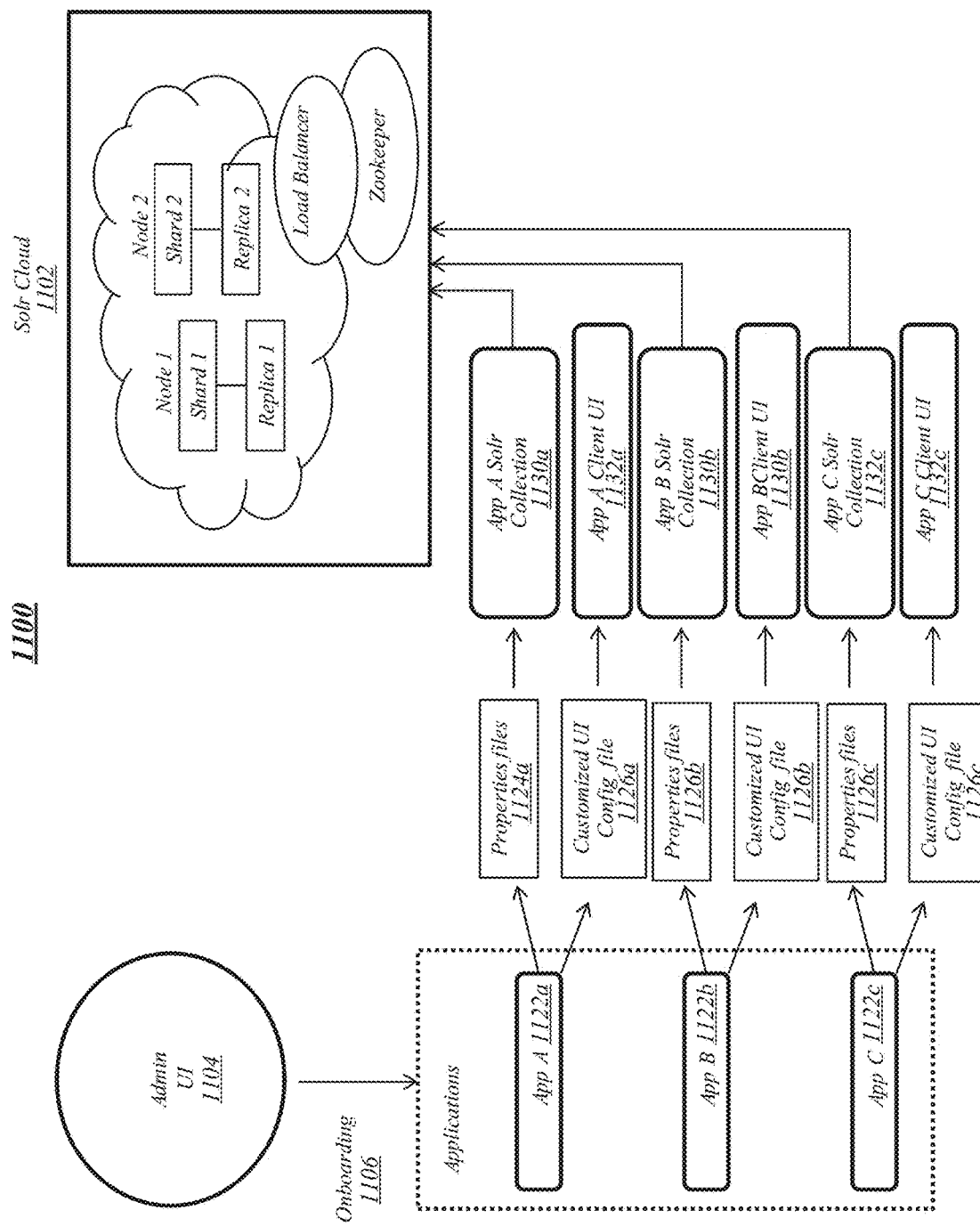
FIG. 11 illustrates a third operating environment according to some embodiments.

FIG. 11 illustrates an example of an operating environment 1100 that may be representative of various embodiments. The operating environment 1100 depicted in FIG. 11 may implement information rank and retrieval processes according to various embodiments. As shown in FIG. 11, operating environment 1100 may include a search platform cloud 1102. An administrator UI 1104 may operate to facilitate onboarding of applications 1122a-c, such as business cases (BC) applications. Applications 1122a-c may be associated with corresponding properties files 1124a-c and/or (customized) UI configuration files 1126a-c. In various embodiments, properties files 1124a-c may be associated with a corresponding application search platform (for instance, Solr™) collection 1130a. In exemplary embodiments, UI configuration files 1126a-c may be associated with an application client UI 1132a-c.

Figure 12:
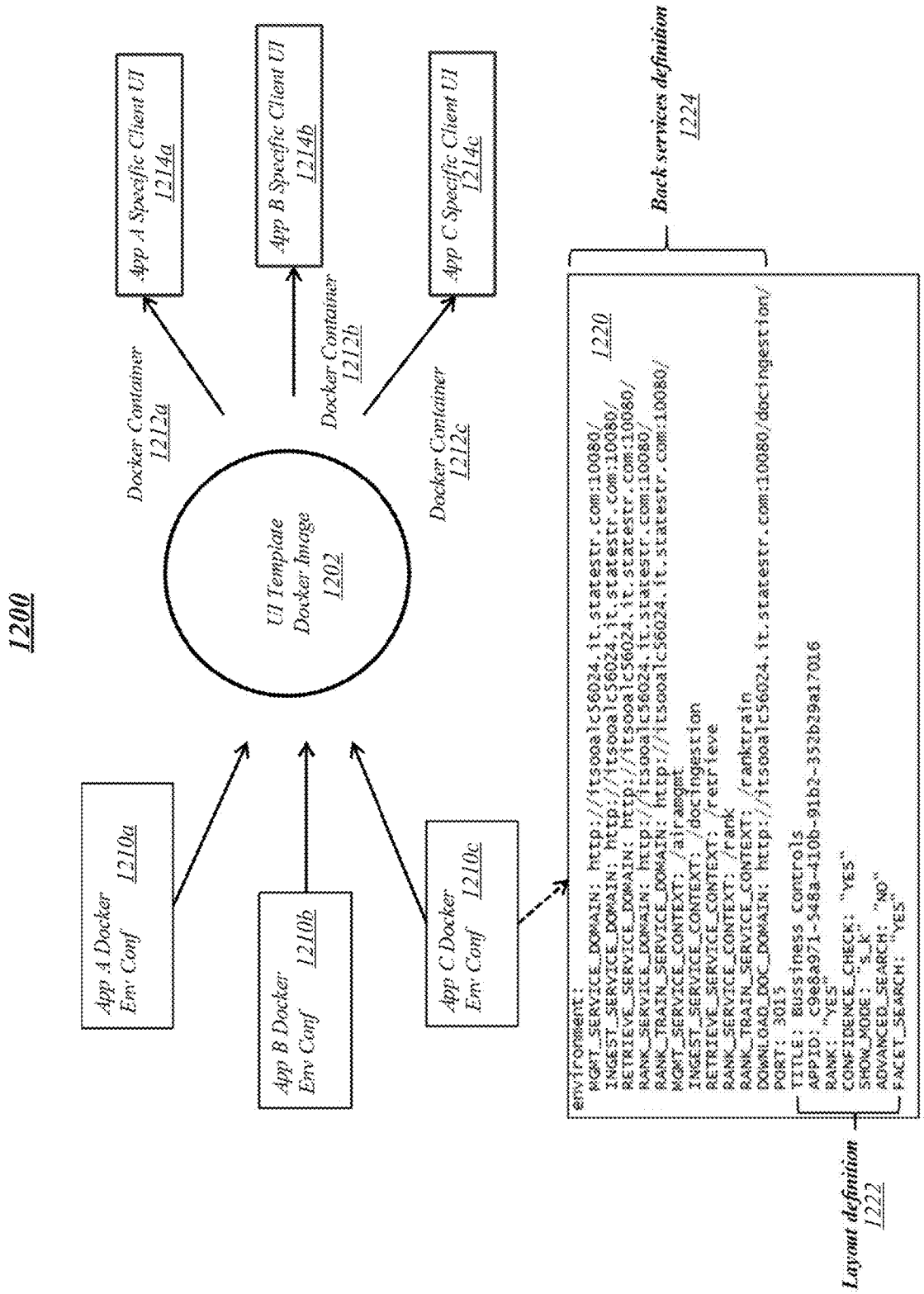
FIG. 12 illustrates an embodiment of a third logic flow.

FIG. 12 illustrates an example of an operating environment 1200 that may be representative of various embodiments. The operating environment 1200 depicted in FIG. 12 may implement information rank and retrieval processes according to various embodiments. As shown in FIG. 12, operating environment 1200 may include a UI template docker image 1202. Applications may include or otherwise be associated with an environment configuration 1220. For example, applications may be associated with docker environment configurations 1210a-c. UI template docker image 1202 may use application environment configurations 1210a-b to generate docker containers 1212a for application specific client UIs 1214a-c. Environment configuration 1220 may include various definitions, including, without limitation, a layout definition 1222 and/or a back services definition 1224.

Figure 13:
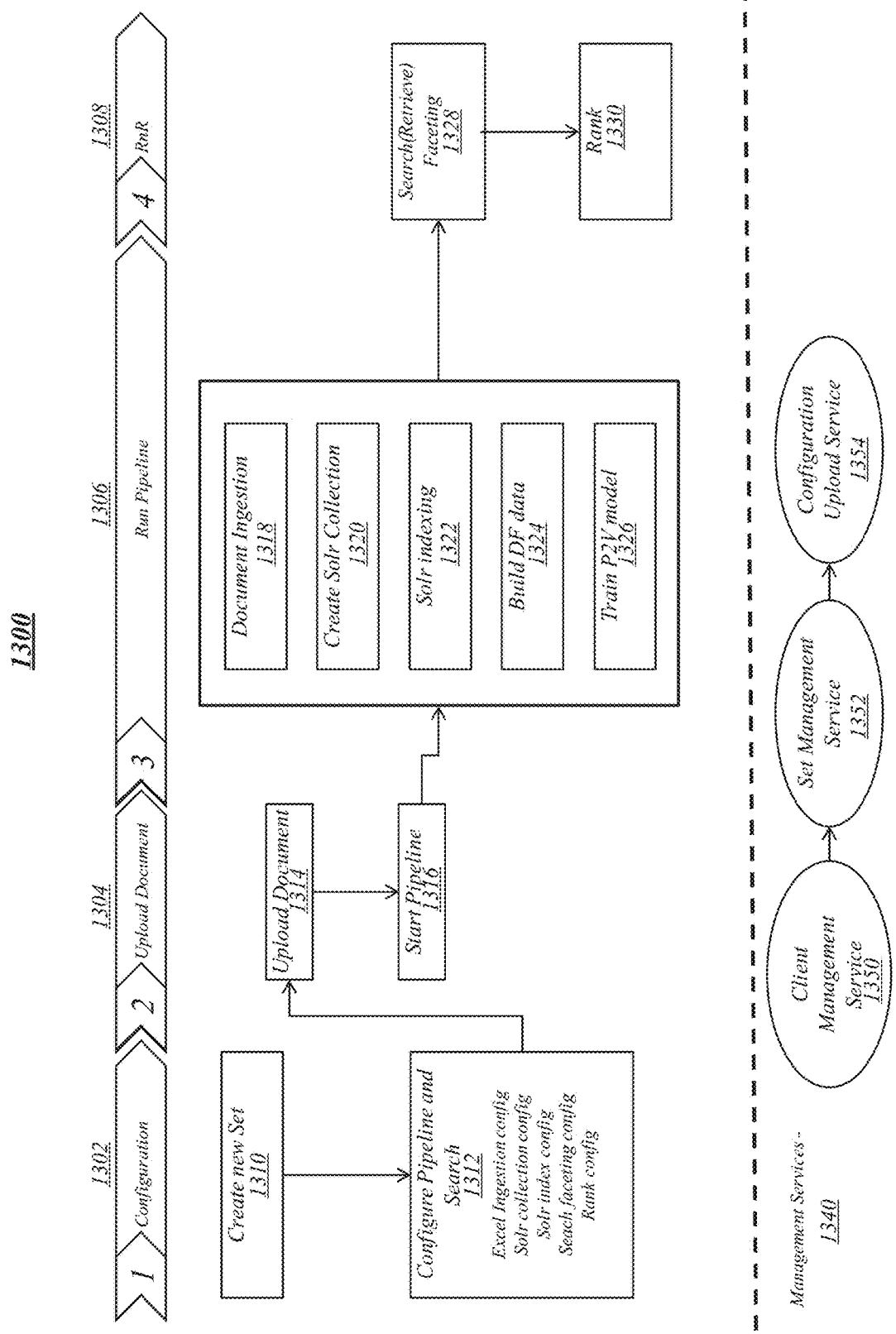
FIG. 13 illustrates an embodiment of a fourth logic flow.

FIG. 13 illustrates an embodiment of a logic flow 1300. Logic flow 1300 may be representative of some or all of the operations executed by one or more embodiments described herein, such as computing device 701. In some embodiments, logic flow 1300 may be representative of some or all of the operations of an information rank and retrieval process.

In various embodiments, logic flow 1300 may include a high-level process that includes a configuration phase 1302, an upload document phase 1304, a run pipeline phase 1306, and/or a rank and retrieve (RnR) phase 1308. In configuration phase 1302, logic flow 1300 may create a new set 1310 and configure pipeline and search 1312. During upload document phase 1304, logic flow may upload a document 1314 and start the pipeline 1316.

In run pipeline phase 1306, logic flow 1300 may perform document ingestion 1318, create search platform (for example, Solr™) collection 1320, search platform indexing 1322, build DF data 1324, and/or train P2V model 1326. During RnR phase 1308, logic flow 1300 may perform search (retrieve) faceting 1328 and/or ranking 1330.

In various embodiments, logic flow 1300 may include or otherwise be associated with management services 1340. For example, management services 1340 may include a client management service 1350, a set management service 1352, and/or a configuration upload services 1354.

Figure 14:
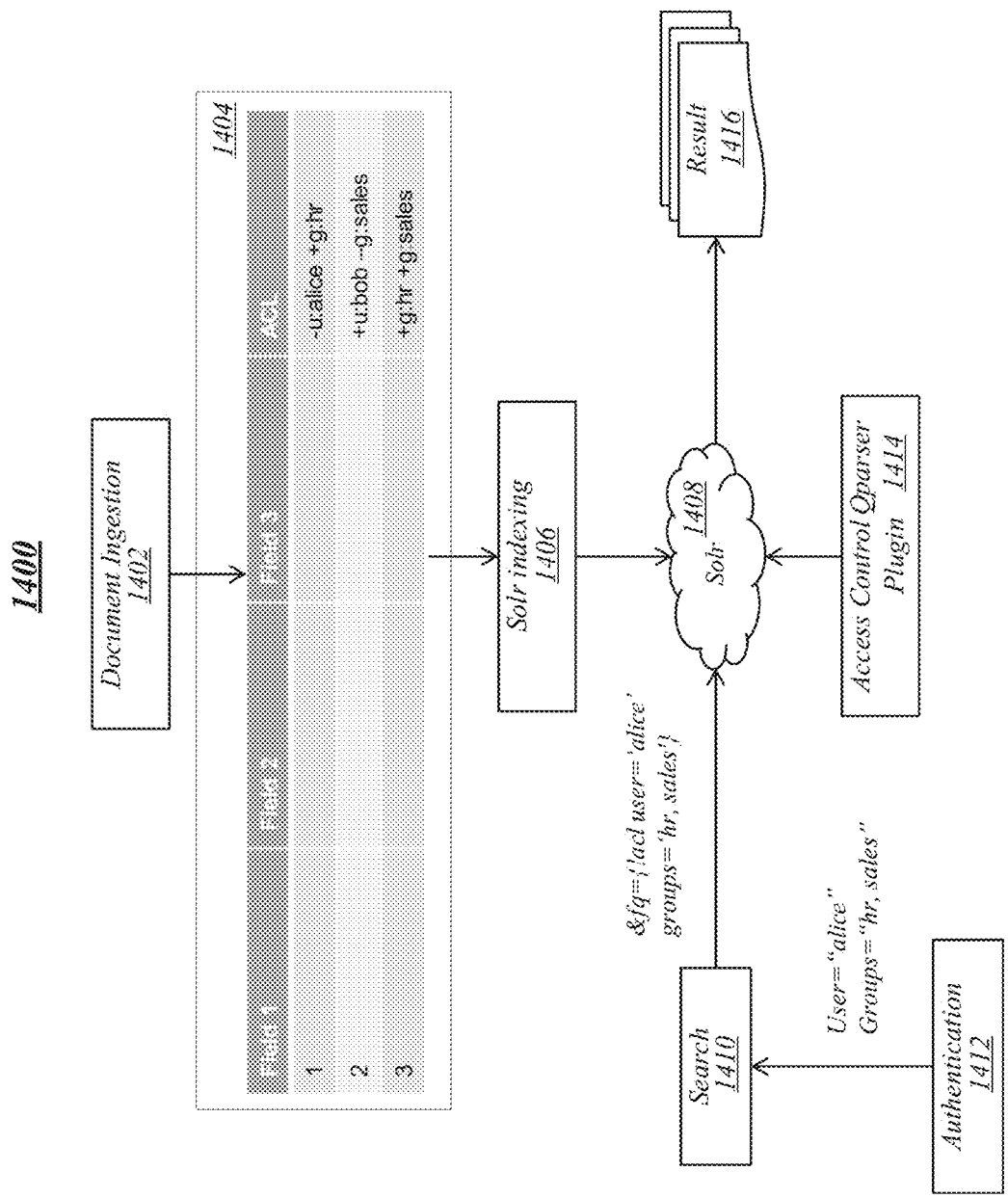
FIG. 14 illustrates an embodiment of a fifth logic flow.

FIG. 14 illustrates an embodiment of a logic flow 1400. Logic flow 1400 may be representative of some or all of the operations executed by one or more embodiments described herein, such as computing device 701. In some embodiments, logic flow 1400 may be representative of some or all of the operations of an information rank and retrieval process.

In various embodiments, logic flow 1400 may perform document ingestion 1402 to generate information component 1404. At block 1406, logic flow 1400 may perform indexing, for example, for search platform 1408. Logic flow 1400 may perform authentication 1412, search 1410, and/or access control 1414 (for instance, via a Qparser plugin for a Solr™ implementation), which may operate to facilitate search platform 1408 generating or otherwise providing search results 1416.

Figure 15:
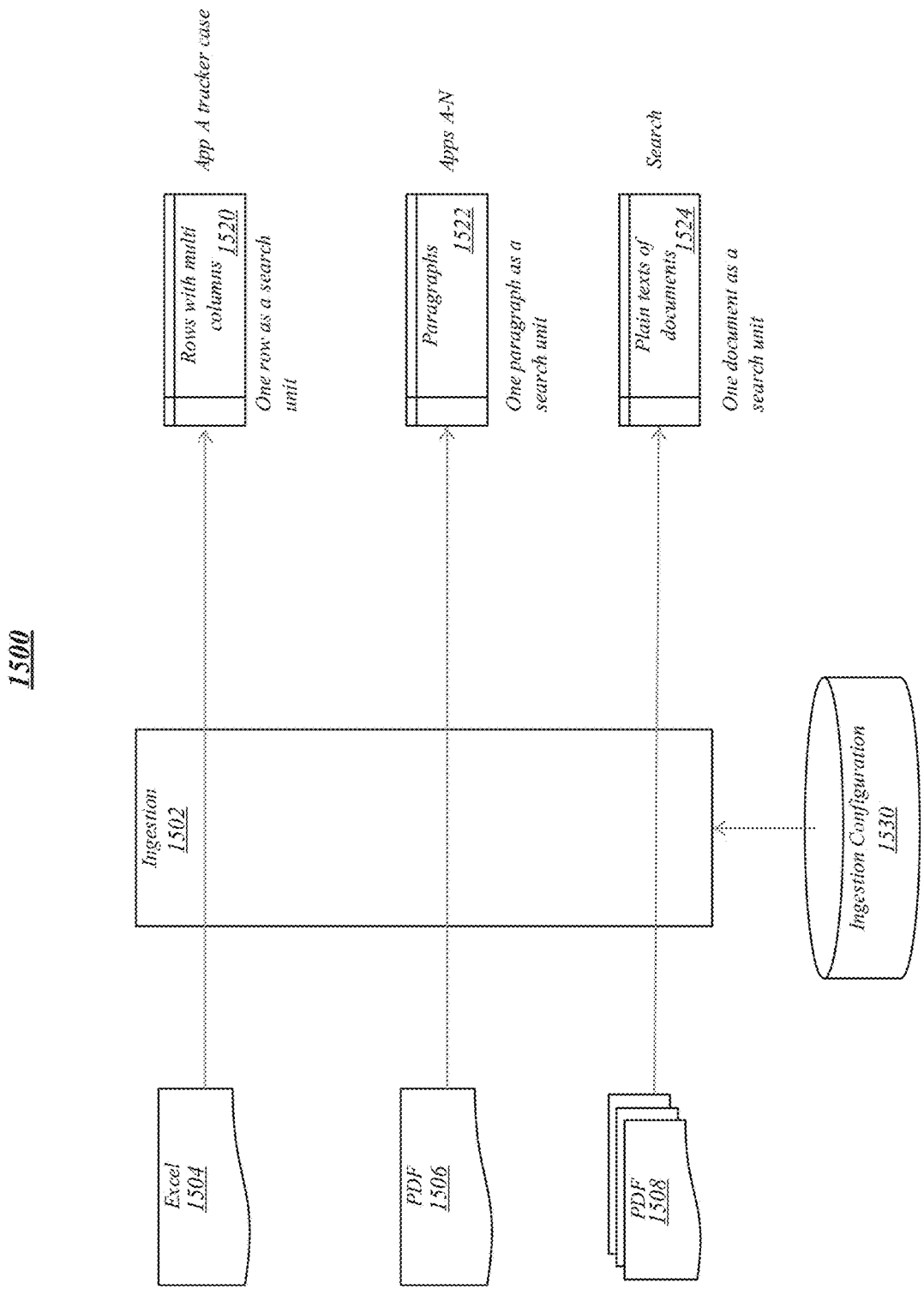
FIG. 15 illustrates an embodiment of a sixth logic flow.

FIG. 15 illustrates an embodiment of a logic flow 1500. Logic flow 1500 may be representative of some or all of the operations executed by one or more embodiments described herein, such as computing device 701. In some embodiments, logic flow 1500 may be representative of some or all of the operations of an information rank and retrieval process.

In various embodiments, logic flow 1500 may perform ingestion 1502 of various documents, such as a comma delimited or Microsoft® Excel® file 1504 and/or portable document format (PDF) files 1506, 1508. In some embodiments, ingestion 1502 may operate according to ingestion configuration 1530.

Logic flow 1500 may extract information from files 1504 in various processes as part of ingestion 1502. For example, logic flow 1500 may read rows, columns, sheets, and/or the like from Excel® file 1504 (for example, read one sheet of Excel® file 1504 and get rows with multi-columns) to generate ingested information 1520. In another example, logic flow 1500 may extract paragraphs from PDF 1506 to generate ingested information 1522 and/or plain text from PDF 1508 to generate ingested information 1524.

Figure 16:
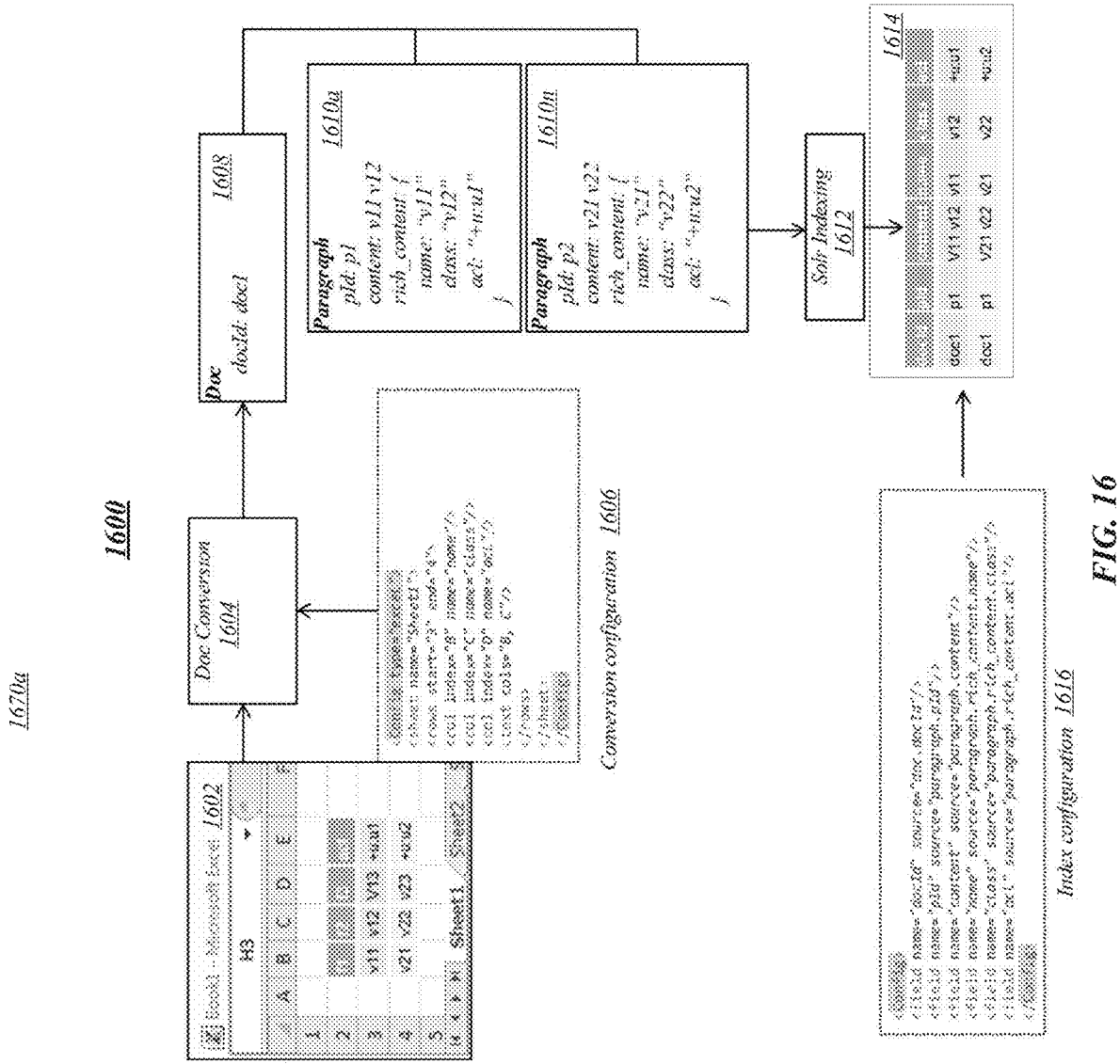
FIG. 16 illustrates an embodiment of a seventh logic flow.

FIG. 16 illustrates an embodiment of a logic flow 1600. Logic flow 1600 may be representative of some or all of the operations executed by one or more embodiments described herein, such as computing device 701. In some embodiments, logic flow 1600 may be representative of some or all of the operations of an information rank and retrieval process, for example, including a document conversion and/or indexing process.

In various embodiments, logic flow 1600 may access a data file 1602, such as an Excel® file, for document conversion 1604 according to a conversion configuration 1606. Document conversion 1604 may generate a converted document 1608 associated with various content, such as paragraphs 1610*a-n*. In some embodiments, generated paragraphs (such as paragraphs 1610*a-n*) may be used for various functions, including, without limitation, training P2V models, building DF data, question search, and/or the like. Logic flow 1600 may perform indexing 1612 according to an index configuration 1616 to generate an index 1614.

Figure 17:
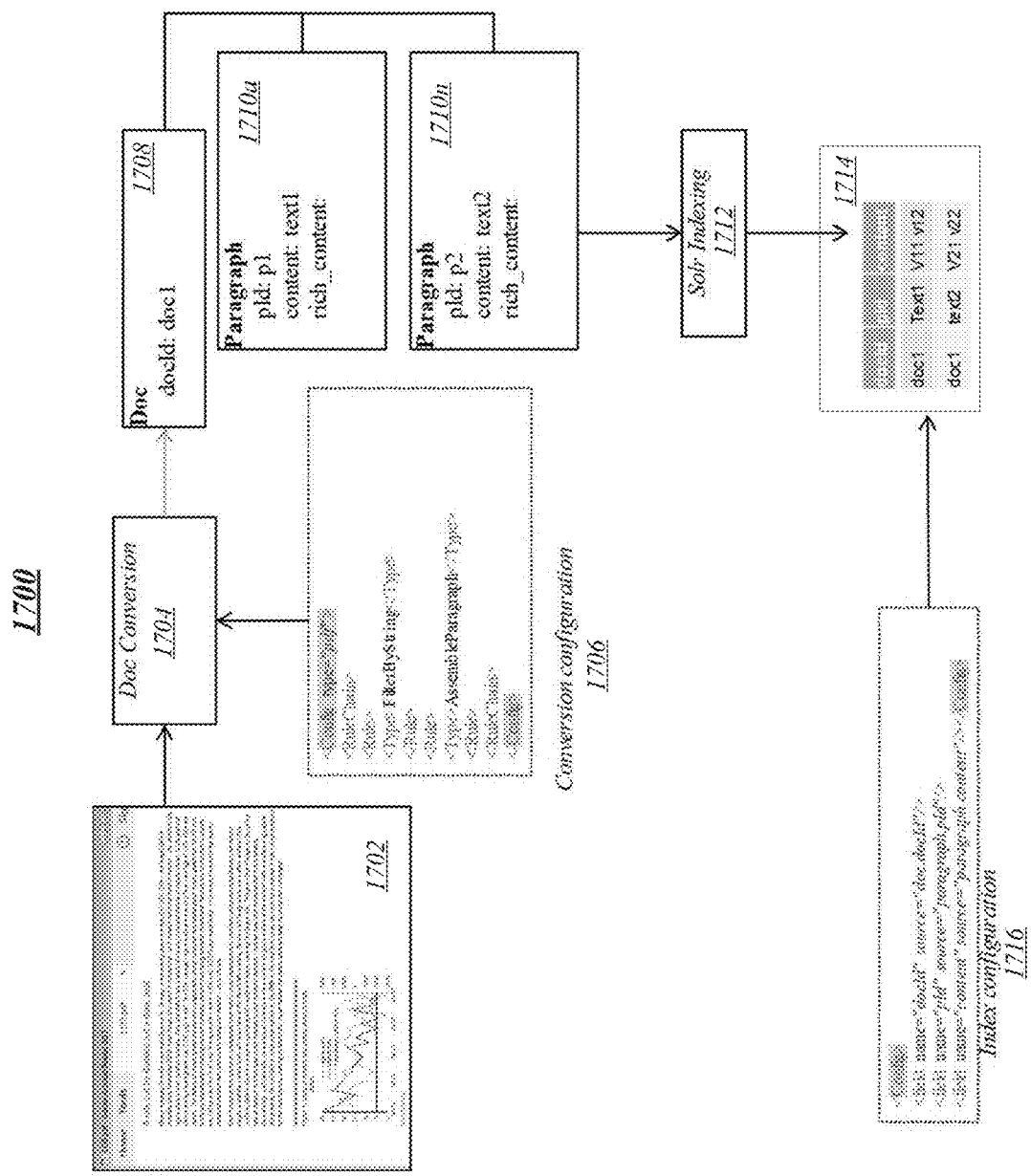
FIG. 17 illustrates an embodiment of a eighth logic flow.

FIG. 17 illustrates an embodiment of a logic flow 1700. Logic flow 1700 may be representative of some or all of the operations executed by one or more embodiments described herein, such as computing device 701. In some embodiments, logic flow 1700 may be representative of some or all of the operations of an information rank and retrieval process, for example, including a document conversion and/or indexing process.

In various embodiments, logic flow 1700 may access a data file 1702, such as a PDF file, for document conversion 1704 according to a conversion configuration 1706. Document conversion 1704 may generate a converted document 1708 associated with various content, such as paragraphs 1710*a-n*. Logic flow 1700 may perform indexing 1712 according to an index configuration 1717 to generate an index 1714.

Figure 18:
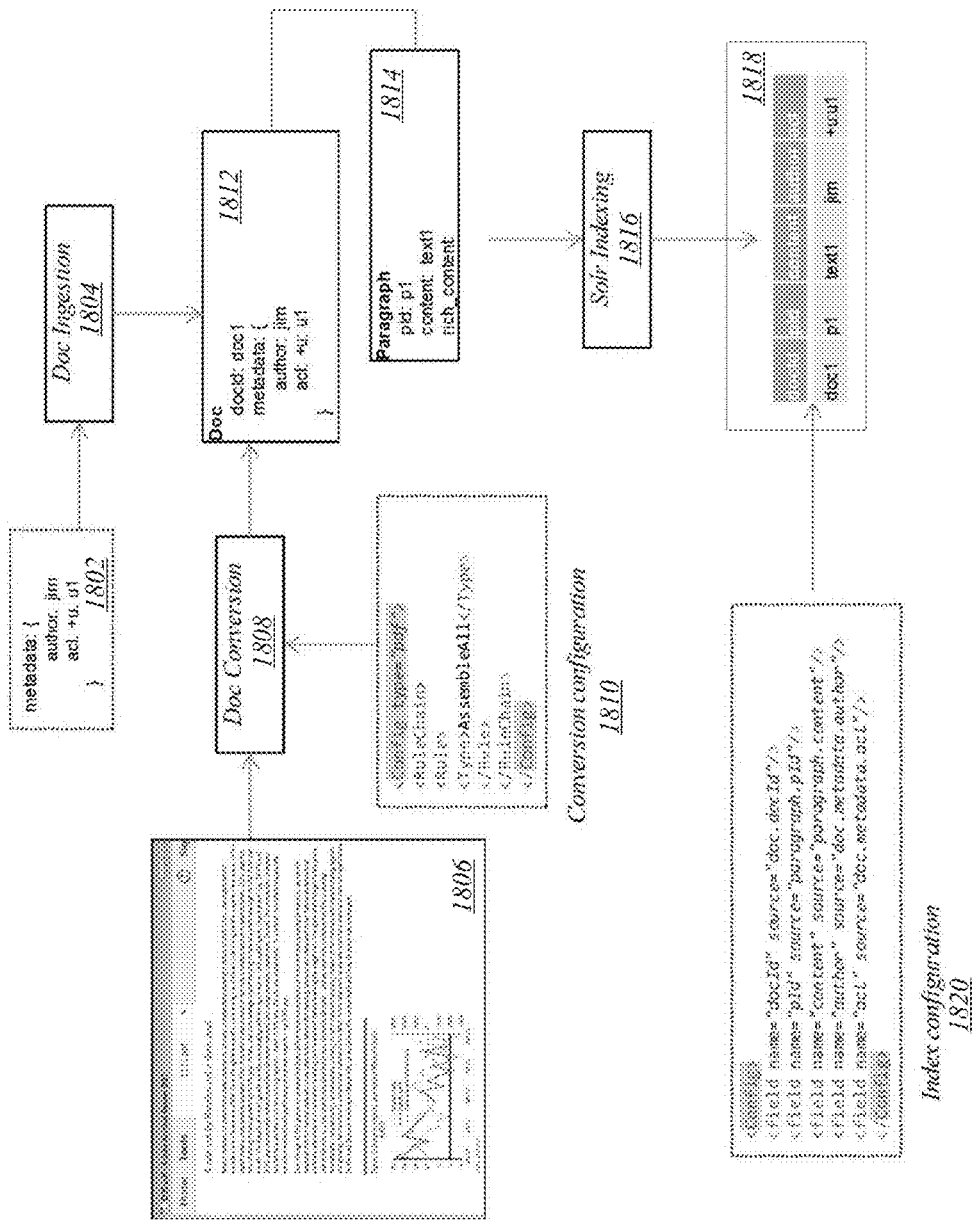
FIG. 18 illustrates an embodiment of a ninth logic flow.

FIG. 18 illustrates an embodiment of a logic flow 1800. Logic flow 1800 may be representative of some or all of the operations executed by one or more embodiments described herein, such as computing device 701. In some embodiments, logic flow 1800 may be representative of some or all of the operations of an information rank and retrieval process, for example, including a document conversion and/or indexing process.

In various embodiments, logic flow 1800 may access a data file 1806, such as a PDF file, for document conversion 1808 according to a conversion configuration 1810. Document conversion 1808 may generate a converted document 1812 based on document ingestion 1804 according to, for example, metadata 1802. Converted document 1812 may be associated with various content, such as paragraph 1814. Logic flow 1800 may perform indexing 1816 according to an index configuration 1820 to generate an index 1818.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

What is claimed is:

1. An apparatus, comprising:
   a processor; and
   a memory storing instructions which when executed by the processor cause the processor to:
   access an ingested document,
   generate a converted document from the ingested document based on a conversion configuration, the converted document comprising a plurality of paragraphs, and
   generate an index, according to an index configuration, based on the converted document;
   train a paragraph2vector (P2V) model based on the plurality of paragraphs;
   retrieve and rank, via a rank model, additional ingested documents, the rank model comprising a machine learning model;
   save feedback associated with ranking the additional ingested documents; and
   retrain the rank model based on the feedback.

2. The apparatus of claim 1, the ingested document comprising one of a comma delimited file or a portable document format file.

3. The apparatus of claim 1, the plurality of paragraphs having content of the ingested document.

4. The apparatus of claim 3, the instructions, when executed by the processor, to cause the processor to generate document frequency information based on the plurality of paragraphs.

5. The apparatus of claim 1, the instructions, when executed by the processor, to cause the processor to generate an environment configuration for at least application.

6. The apparatus of claim 5, the environment configuration comprising at least one of a back services definition or a layout definition.

7. A method, comprising:
   accessing an ingested document;
   generating a converted document from the ingested document based on a conversion configuration, the converted document comprising a plurality of paragraphs; and
   generating an index based on the converted document and an index configuration;
   training a paragraph2vector (P2V) model based on the plurality of paragraphs;
   retrieving and ranking, via a rank model, additional ingested documents, the rank model comprising a machine learning model;
   saving feedback associated with ranking the additional ingested documents; and
   retraining the rank model based on the feedback.

8. The method of claim 7, the ingested document comprising one of a comma delimited file or a portable document format file.

9. The method of claim 7, the plurality of paragraphs having content of the ingested document.

10. The method of claim 9, comprising generating document frequency information based on the plurality of paragraphs.

11. The method of claim 9, comprising generating an environment configuration for at least application.

12. The method of claim 11, the environment configuration comprising at least one of a back services definition or a layout definition.

13. A computer-readable storage medium, storing instructions that when executed by the processor circuit cause the processor circuit to:
    access an ingested document;
    generate a converted document from the ingested document based on a conversion configuration, the converted document comprising a plurality of paragraphs; and
    generate an index based on the converted document and an index configuration;
    train a paragraph2vector (P2V) model based on the plurality of paragraphs;
    retrieve and rank, via a rank model, additional ingested documents, the rank model comprising a machine learning model;
    save feedback associated with ranking the additional ingested documents; and
    retrain the rank model based on the feedback.

14. The computer-readable storage medium of claim 13, the ingested document comprising one of a comma delimited file or a portable document format file.

15. The computer-readable storage medium of claim 13, the plurality of paragraphs having content of the ingested document.

16. The computer-readable storage medium of claim 15, storing instructions that when executed by the processor circuit cause the processor circuit to generate document frequency information based on the plurality of paragraphs.

17. The computer-readable storage medium of claim 13, storing instructions that when executed by the processor circuit cause the processor circuit to generate an environment configuration for at least application.

* * * * *